June 6, 1933.  M. E. STEPHENSON  1,912,801
REDUCING GEAR MECHANISM
Filed Dec. 3, 1931  2 Sheets-Sheet 1
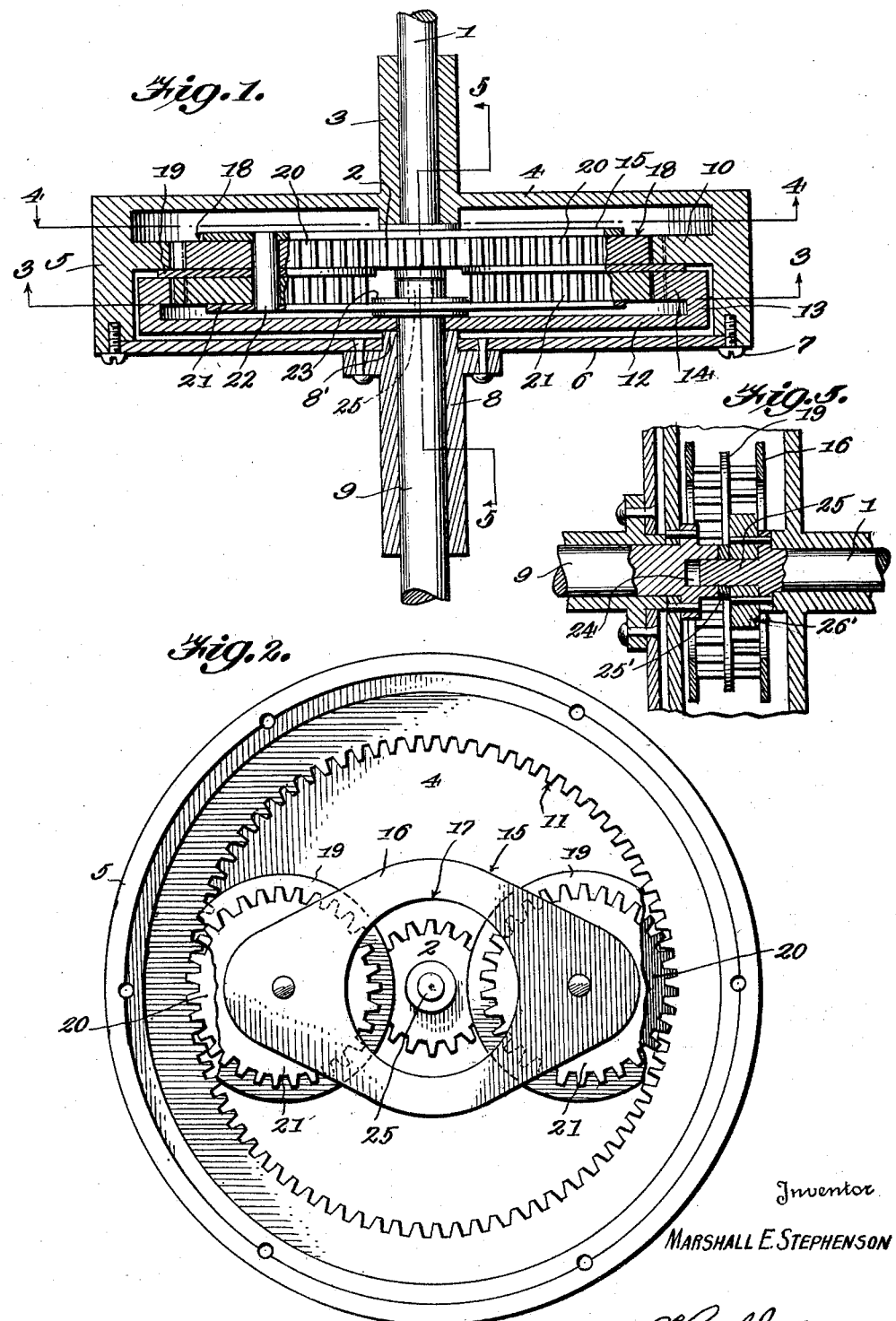
Inventor
MARSHALL E. STEPHENSON
By Irving A. Heathran
Attorney June 6, 1933.   M. E. STEPHENSON   1,912,801
REDUCING GEAR MECHANISM
Filed Dec. 3, 1931   2 Sheets-Sheet 2

Inventor
MARSHALL E. STEPHENSON
Irving A. McEathran
Attorney

Patented June 6, 1933

1,912,801

UNITED STATES PATENT OFFICE

MARSHALL E. STEPHENSON, OF HUMBOLDT, KANSAS

REDUCING GEAR MECHANISM

Application filed December 3, 1931. Serial No. 578,823.

This invention relates to a reducing gear mechanism and has for its object the production of a simple and efficient reducing gear, whereby a large reduction of speed may be accomplished with a minimum number of parts.

Another object of this invention is the production of a simple and efficient reducing gear which may be used in connection with chain blocks, electric hoists, and machinery of other character with equally satisfactory results, and in any place where speed reduction is required through the use of gears.

A still further object of this invention is the production of a simple and efficient reducing gear which will constitute a self-acting brake to produce a back-stop and prevent the unwinding of the driven shaft should power from the prime mover or driving shaft be suddenly reduced or cut off.

A still further object of this invention is the production of a simple and efficient reducing gear mechanism whereby the driving shaft may be driven with facility both in a forward as well as in a reverse direction for efficiently actuating the driven shaft, and at the same time will prevent the reverse movement of the driven shaft except through the application of power to the driving shaft.

With these and other objects in view, this invention consists in certain novel constructions, combinations and arrangements of parts as will be hereinafter fully described, and claimed.

In the drawings:—

Figure 1 is a transverse sectional view through the gear reducing mechanism, certain portions of the gearing being shown in elevation;

Figure 2 is a side elevation of the main casing of the reducing gear mechanism showing the cover plate removed;

Figure 5 is a section taken on line 5—5 of Figure 1.

Figure 3:
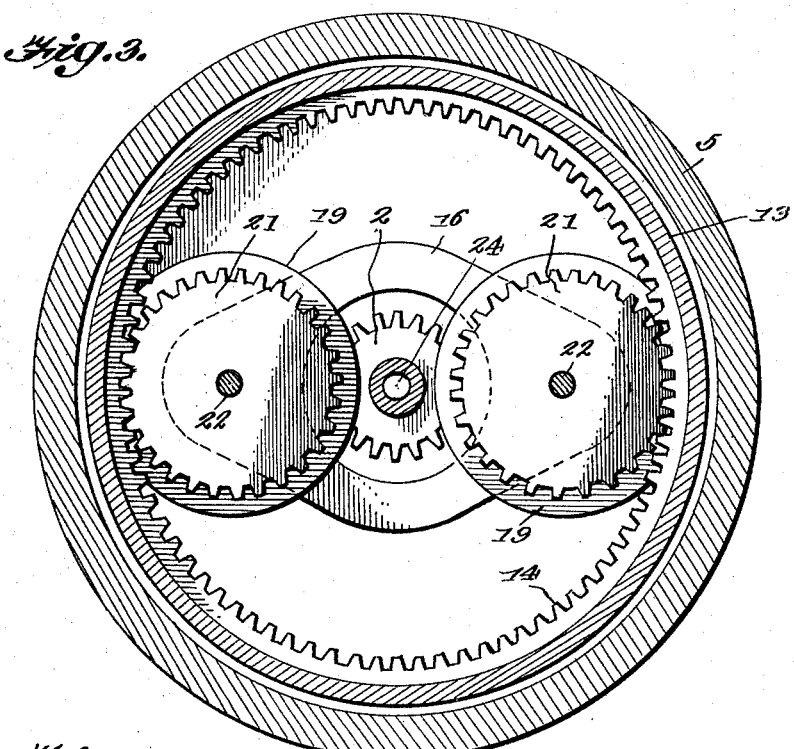
Figure 3 is a section taken on line 3—3 of Figure 1.
Figure 4:
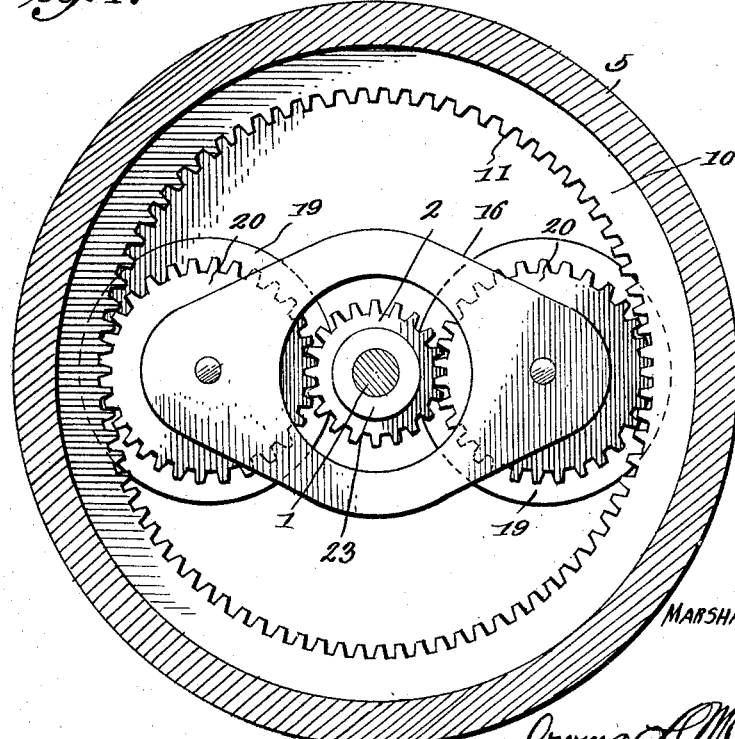
Figure 4 is a section taken on line 4—4 of Figure 1.

By referring to the drawings, it will be seen that 1 designates the main driving shaft which carries a pinion 2 at its inner end, the main driving shaft being journaled in the sleeve 3 carried by the gear housing or casing 4. This gear housing or casing 4 is provided with an annular flange 5 over which a cover plate 6 is removably mounted, the cover plate 6 being held in position through the medium of suitable retaining screws 7. A driven shaft supporting sleeve 8 is secured to this cover plate 6 and this sleeve 8 supports the driven shaft 9, as shown clearly in Figure 1.

The inner face of the flange 5 carries an integral ring gear 10, having an even number of teeth 11 formed upon the inner face of the ring gear 10 for the purpose of illustration, eighty teeth being shown.

A floating disc 12 is keyed or otherwise fixedly secured to the driven shaft 9 and the floating disc 12 is provided with an inwardly extending annular flange 13, which flange has formed near its inner edge an inwardly extending ring gear 14 having a plurality of teeth arranged in an uneven number for the purpose of illustration, eighty-one teeth being shown as illustrated in Figure 3. The ring gear 14 will therefore constitute a floating ring gear as contra-distinguished with stationary ring gear 10.

A floating yoke 15 is mounted within the casing or housing 4, and this yoke 15 comprises a pair of parallel plates 16 having centrally located apertures 17 formed therein for the purpose of permitting the yoke 15 to move easily in a circular direction within the housing or casing 4 without interfering with either the driving or the driven shaft. At each end of the yoke 15, and between the plates 16 thereof, are mounted the twin gears 18, these gears 18 being clamped or firmly secured together against independent movement in each set by being firmly secured to the division disc 19, as clearly shown in Figure 1. The division disc 19 which separates the gears of each pair projects beyond the periphery of the gears and these discs, or projecting peripheries of the discs, are mounted so as to extend between the stationary ring gear 10 and the floating ring gear 14, as shown in Figure 1, thereby firmly holding the floating yoke against lateral displacement and firmly holding the twin gears in meshing relation with the respective stationary ring gear 10 and floating ring gear 14.

The primary gear 20 of each twin gear meshes with the central pinion 2, as shown in Figure 1, and the discs 19 of each twin gear overhang the pinions 2, as shown in Figure 1, so as to firmly and properly hold the gears 20 in proper meshing relation with the pinions 2. Each twin gear 18 is also provided with an auxiliary gear section 21, the teeth on the auxiliary gear section of one twin gear being in transverse alignment with the teeth of the primary gear 20 of one twin gear, whereas the teeth on the other auxiliary gear section 21 are arranged in staggered relation with respect to the teeth on the companion gear section 20 of the same twin gear. There are preferably thirty teeth arranged or formed in each of the gears 20 and 21.

As shown clearly in Figure 1 of the drawings, the primary gear sections 20 will mesh with the central pinion 2, and the stationary ring gear 10. The auxiliary gear section 21 of each twin gear will mesh with the floating ring gear 14. It should be understood that each of the twin gears is freely rotatable upon its bearings 22 carried by the floating yoke 15. As shown in Figure 1, the sleeve 8 is provided with an inwardly projecting neck 8' against which the floating disc 12 abuts, for the purpose of holding this floating disc in spaced relation with respect to the inner face of the cover plate 6. The driven shaft 9 is provided with a suitable collar 23 which is adapted to abut against the floating disc 12 and firmly hold the driven shaft 9 in position. The driven shaft 9 may be provided with a suitable socket 24 at its inner end for the purpose of receiving a projecting stud 25 formed upon the end of the driving shaft 1, these two shafts being independently rotatable and so mounted as to prevent frictional drive one with respect to the other.

A soft metal washer or thrust bearing 25' may be interposed between the ends of the driven and driving shafts, and the stud 25 of the driving shaft 1 may carry a bearing disc 26'.

From the foregoing description it will be seen that a very simple and efficient reducing gear mechanism has been provided comprising a minimum number of parts wherein a stationary ring gear is employed over which is adapted to travel a floating yoke carrying twin gears, one gear section of the twin gears meshing with the stationary ring gear, and the other gear section of each twin gear meshing with a floating ring gear which is carried by the driven shaft. As previously pointed out, it is important that there should be a difference in the ratio of the teeth of the stationary ring gear 10 and the floating ring gear 14, preferably one additional tooth being formed in the ring gear 14 with respect to the stationary ring gear 10. By way of illustration, it should be noted that the reducing gear mechanism consists of a drive shaft which may have a direct connection to a motor or other driving means, and on the other end of the shaft is mounted a suitable pinion such as is illustrated and indicated by the numeral 2. For convenience of description, preferably this gear or pinion is provided with twenty teeth and this gear 2 will in turn engage the gear sections 20 of the twin gears 18, which gears 20 are provided with thirty teeth and are mounted upon the floating carriage or yoke. The gears 20 in turn engage a stationary ring gear 10 which ring gear comprises eighty teeth. The floating yoke driven from the drive shaft has a speed of one-fifth that of the drive, and this ratio may be increased or decreased by merely changing the gear combination. On the same shaft 22 are mounted the auxiliary gear sections 21 having thirty teeth and being arranged as previously described, which auxiliary gear sections 21 mesh with the floating ring gear 14, which ring gear is provided with eighty-one teeth, to which ring gear is secured, as described, the driven or slow-speed shaft 9. This gives a ratio of reduction of about 80 to 1, or a total of 405 to 1.

It is quite important that there be a difference in the number of teeth, such for instance as illustrated by the example above, in order to provide the 80 to 1 ratio of reduction, and in order to compensate for this extra tooth in the ring gear, one of the gear sections 21 carried by the floating yoke is set one-half tooth forward, or arranged in staggered relation with respect to its companion gear section 20 in the same twin gear 18.

From the foregoing description, it will be seen that a very simple and efficient means has been produced whereby a minimum amount of power will be necessary to drive the drive shaft 1 in proportion to the load which may be driven or lifted by the driven shaft 9. It should be further understood that owing to the particular structure above described, the device will constitute a self-braking mechanism thereby constituting an efficient back-stop to prevent the reverse rotation of the driven shaft when power is unexpectedly or suddenly cut off from the driving shaft. This braking effect is obtained by reason of the high ratio (80–1 in the present instance) of speed reduction and the consequent high ratio between the power and load so that, in actual practice, the friction at the power end is sufficient to more than balance a very considerable torque on the driven shaft. Furthermore, it should be understood that a very simple, inexpensive and efficient device has been produced which will not require the construction of special machinery and the like, to produce the device, merely a very small number of parts being employed which may be provided and produced by the present well-known type of gear-cutting machinery.

It should be further understood that many modifications of the present invention may be employed without departing from the spirit of the invention so long as the same general principle is involved and the differences in the number of teeth may be substituted in the gear sections 20 and 21 in place of the ring gears 10 and 14 if desired, without departing from the spirit of the invention. It should be further understood that any suitable or desired means may be employed for the purpose of moving the floating yoke 15 properly within the housing 4, for the purpose of driving the floating ring gear 14 and consequently rotating the slow-speed or driven shaft 9.

Certain detail changes in the mechanical construction may be employed without departing from the spirit of the invention so long as such changes fall within the scope of the appended claims.

Having described the invention, what is claimed as new is:

1. A reducing gear mechanism of the class described comprising a housing, an internal stationary ring gear mounted within said housing, a driving shaft carried by said housing, a pinion mounted upon said driving shaft, a floating yoke mounted within said housing, twin gears carried by each end of said floating yoke, each twin gear comprising a primary gear section and an auxiliary gear section, said driving pinion carried by said driving shaft meshing with the primary gear section of each twin gear, the primary gear section of each twin gear meshing with said stationary ring gear, a floating ring gear, a driven shaft connected to said floating ring gear, said auxiliary gear section of each twin gear meshing with said floating ring gear, said stationary ring gear having an even number of teeth, said floating ring gear having an uneven number of teeth greater than the number on the stationary ring gear, the teeth of the auxiliary gear section of one twin gear being arranged in staggered relation with respect to the other gear section of the same twin gear, a disc plate separating the primary and auxiliary gear sections of said twin gears and having the periphery thereof projecting beyond the teeth of said twin gears, the periphery of said disc also traveling between said stationary and said floating ring gear.

2. In combination, a fixed cylindrical housing closed at both ends, an internal rib projecting circumferentially from the annular wall of the housing and provided with teeth to form a stationary ring gear, a driving shaft journalled in one end of the housing and extending thereinto, a driven shaft journalled in the other end of the housing and extending thereinto in alinement with the driving shaft, one of said shafts having a reduced end forming a journal and the other shaft having a bearing recess receiving said journal, a pair of spaced yokes in said housing provided with central openings wherethrough the respective shafts pass, shafts connecting the yokes adjacent their ends, a pair of twin gears revolubly mounted on each of the last mentioned shafts, one gear of pair of twin gears meshing with said stationary ring gear, a floating disk arranged between said pairs of ring gears and the head of the housing carrying the driven shaft, a flange on the floating disk provided with internal teeth forming a floating ring gear, the teeth on the floating ring gear being one more in number than the teeth on the stationary ring gear, said floating ring gear meshing with the remaining twin gears, and a driving gear on the driving shaft meshing with the twin gears engaging the stationary ring gear.

In testimony whereof I affix my signature.

MARSHALL E. STEPHENSON.